(12) United States Patent
Shi et al.

(10) Patent No.: US 8,275,919 B2
(45) Date of Patent: Sep. 25, 2012

(54) DEVICE FOR TAPPING USB POWER

(75) Inventors: Jia Xiang Shi, Singapore (SG); Ingo Volkening, Singapore (SG)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

(21) Appl. No.: 13/237,991

(22) Filed: Sep. 21, 2011

(65) Prior Publication Data

US 2012/0011379 A1   Jan. 12, 2012

Related U.S. Application Data

(63) Continuation of application No. 11/776,974, filed on Jul. 12, 2007, now Pat. No. 8,065,451.

(51) Int. Cl.
*G06F 13/12* (2006.01)
*G06F 13/38* (2006.01)

(52) U.S. Cl. .......................................... 710/62; 710/74

(58) Field of Classification Search .................. 710/62, 710/74
See application file for complete search history.

(56) References Cited

U.S. PATENT DOCUMENTS

| | | | | |
|---|---|---|---|---|
| 6,360,269 | B1 * | 3/2002 | Mamros et al. | 709/228 |
| 7,072,989 | B1 * | 7/2006 | Kolokowsky et al. | 710/8 |
| 7,287,099 | B1 * | 10/2007 | Powderly et al. | 710/7 |
| 2006/0123212 | A1 * | 6/2006 | Yagawa | 711/162 |
| 2007/0140193 | A1 * | 6/2007 | Dosa et al. | 370/338 |
| 2008/0104422 | A1 * | 5/2008 | Mullis et al. | 713/300 |

OTHER PUBLICATIONS

Microsoft, "Remote NDIS Specification" Revision. 1.1, Aug. 9, 2002.*

* cited by examiner

*Primary Examiner* — Chun-Kuan Lee
*Assistant Examiner* — Farley Abad

(57) ABSTRACT

A device includes a universal serial bus (USB) port comprising a data terminal and a power terminal to receive power from a remote USB port. The device includes a controller coupled to the data terminal of the USB port to provide a USB initialization signal.

17 Claims, 3 Drawing Sheets

DEVICE FOR TAPPING USB POWER

BACKGROUND

Electronic devices without power adaptors provide cost savings and a user friendly experience. One way to provide electronic devices without power adapters is by tapping Universal Serial Bus (USB) power. Some electronic devices tap USB power by simply connecting to a computer's USB host port without consideration for the USB host port's power management requirements. The lack of consideration for the USB host port's power management requirements can lead to a number of problems.

First, the USB host port may provide insufficient power for the electronic device to operate. Typical USB host ports supply current up to 100 mA in compliance with USB standard 7.2.1.3, if a proper initialization process is not performed. Further, if the USB host port implements over current protection and the electronic device requires more than 100 mA of current (i.e. high power) to operate, it is possible that the USB voltage ($V_{BUS}$) will be turned off in response to connecting the electronic device to the USB host port. In some cases, even after the electronic device is disconnected from the USB host port, the USB host port may still be disabled and in an unusable state until the user manually resets the USB host port.

In addition tai the possibility of the USB host port providing insufficient power, the electronic device will loose power when the USB host port enters a suspend mode. In compliance with the USB standard, the USB host port will suspend the USB bus if there are no data transactions over the USB bus for a certain time. After the USB host port suspends the USB bus for lack of data transactions, the USB power draw is limited to 500 µA and the electronic device may loose power or be reset.

Further, in addition to possibility of the USB host port providing insufficient power or entering a suspend mode, tapping USB power without proper initialization may also damage the USB host port. In response to connecting an electronic device to a USB host port, the computer may implement an unrecoverable protection mechanism on the USB host port. Connecting an electronic device to the USB host port may generate inrush current. Depending on the protected current limitation of the USB host port, this inrush current may exceed the current limitation of the USB host port and result in an unrecoverable state where the USB host port is inoperable.

For these and other reasons there is a need for the present invention.

SUMMARY

One embodiment provides a device. The device includes a universal serial has (USB) port comprising a data terminal and a power terminal to receive power from a remote USB port. The device includes a controller coupled to the data terminal of the USB port to provide a USB initialization signal.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
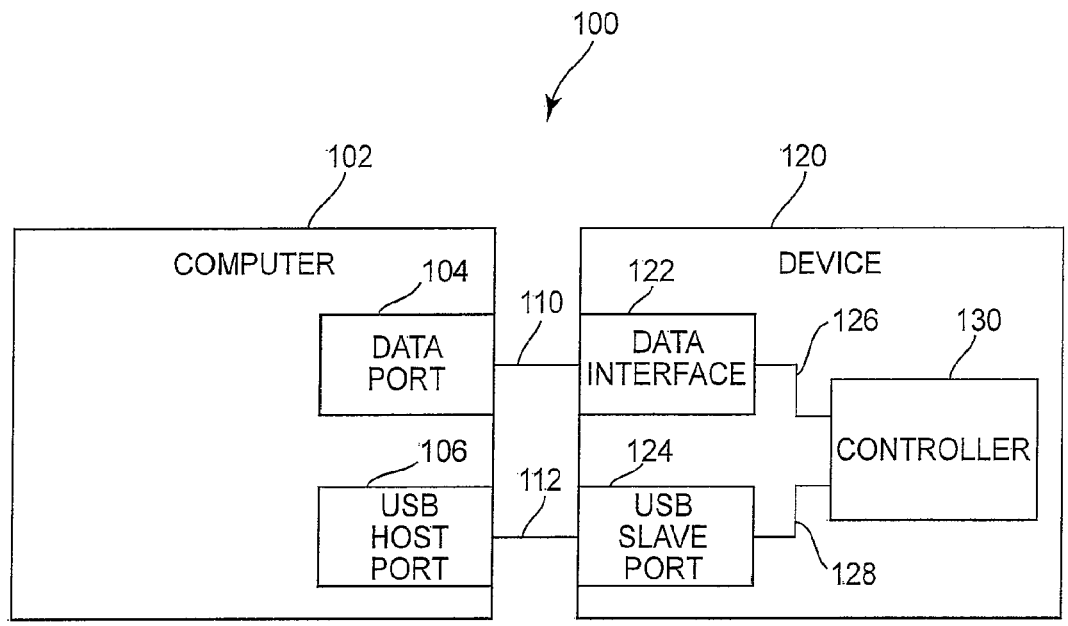
FIG. 1 is as block diagram illustrating one embodiment of a system.

FIG. 1 is a block diagram illustrating one embodiment of a system 100. System 100 includes a computer 102 and an electronic device 120. Computer 102 includes a data port 104, a Universal Serial Bus (USB) host port 106, and other components (not shown), such as a processor and memory. Electronic device 120 includes a data interface 122, a USB slave port 124, and it controller 130. Data interface 122 is electrically coupled to controller 130 through signal path 126. USB slave port 124 is electrically coupled to controller 130 through signal path 128. Data port 104 of computer 102 is electrically coupled to data interface 122 of electronic device 120 through a data cable 110. USB host port 106 of computer 102 is electrically coupled to USB slave port 124 of electronic device 120 through at USB cable 112.

Electronic device 120 is configured to tap USB power from USB host port 106 while fully complying with the USB standard. Electronic device 120 trips the USB power from USB host port 106 without installing an specific driver or supporting software for supporting, driving electronic device 120 on computer 102. In addition, electronic device 120 reliably receives up to 500 mA of constant current from USB host port 106. Electronic device 120 receives sufficient power from USB host port 106, and USB host port 106 is not suspended, disabled, or damaged. In addition electronic device 120 provides energy savings by powering down or shutting down with computer 102.

Computer 102 includes any suitable logical con muting device including a USB host port 106. In one embodiment, computer 102 is a personal computer (PC), workstation, laptop, handheld computer, or other suitable computing device. Data port 104 transmits and/or receives data using any suitable data transmission method. Data port 104 includes an Ethernet port, an IEEE 1394 port, a parallel data port, a serial data port, a game port, or any other suitable data port. In one embodiment, USB host port 106 is a standard USB host port for transmitting and receiving serial data and for providing USB power. In a first state before initialization, USB host port 106 provides up to 100 mA of current to electronic device 120 through USB cable 112. In a second state after initialization, USB host port 106 provides up to 500 mA of current (i.e., high power) to electronic device 120 through USB cable 112.

Electronic device 120 may include any suitable device that uses a predetermined current to operate. For example, in one embodiment, electronic device 120 uses a current higher than the predefined current available by the USB standard. In one embodiment, the current may be up to 500 mA or higher than 500 mA. In one embodiment, electronic device 120 is an Ethernet Asymmetric Digital Subscriber Line (ADSL) modem, an Ethernet Internet Protocol (IP) phone, an Ethernet Analog Telephone Adapter (ATA), or any other suitable electronic device other than a network adaptor. In one embodiment, electronic device 120 transmits and/or receives data from computer 102 through data interface 122. In another embodiment, data interface 122 is excluded and electronic device 120 does not transmit and/or receive data from computer 102.

Data interface 122 transmits and/or receives data from computer 10 through data cable 110. In one embodiment, data interface 122 include an Ethernet port, an IEEE 1394 port, a parallel data port, a serial data port, a game port, or any other suitable data port complementary to data port 104 of computer 102, USB slave port 124 receives USB power and transmits and/or receives control signals from USB host port 106 of computer 102 through USB cable 112.

Controller 130 includes a microprocessor, microcontroller, or other suitable logic circuitry for controlling the operation of electronic device 120. Controller 130 controls data interface 122 through signal path 126 to transmit and/or receive data from computer 102. Controller 130 controls USB slave port 124 through signal path 128 to receive and maintain USB power from computer 102 to power electronic device 120.

Electronic device 120 mimics a Remote Network Driver Interface Specification (RNDIS) device to tap USB power from USB host port 106 of computer 102. Electronic device 120 initializes electronic device 120 as a RNDIS device and utilizes the RNDIS control protocols to keep electronic device 120 active. Since RNDIS is built into Windows, software installation on computer 102 and the associated maintenance of that software is eliminated. Electronic device 120 is properly installed in compliance with the USB standard. Electronic device 120 uses the full USB power management mechanism, receives power reliably, and conforms to CE certification.

Figure 2:
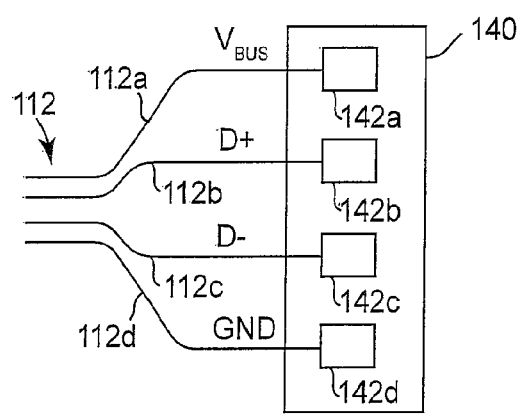
FIG. 2 is a diagram illustrating one embodiment of USB cable connections to a USB slave port.

FIG. 2 is a diagram illustrating one embodiment of USB cable 112 connections to USB slave port 124 of electronic device 120. USB slave port 124 includes a connector 140 including inputs and/or outputs 142a-142d, USB cable 112 includes a USB power ($V_{BUS}$) line 112a, complementary data lines (D+ and D−) 112b and 112c, and a ground (GND) line 112d. $V_{BUS}$ line 112a is electrically coupled to input 142a. Complementary data lines D+ 112b and D− 112c are electrically coupled to inputs/outputs 142b and 142c, respectively. Ground line 112d is electrically coupled to input 142d.

Typical non-compliant electronic devices that tap USB power do not use complementary data lines D+ 112b and D− 112e. In contrast, USB slave port 124 uses all four USB lines 112a-112d and associated inputs and/or outputs 142a-142d to comply with the USB standard for receiving and maintaining USB power for operating electronic device 120.

Figure 3:
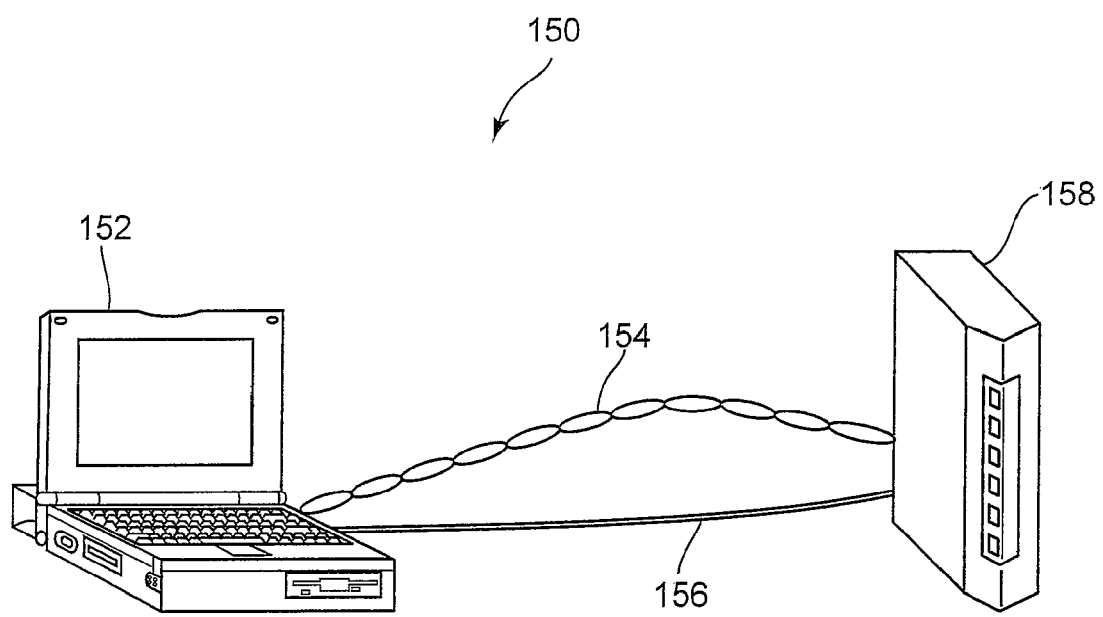
FIG. 3 is a diagram illustrating one embodiment of an electronic device tapping USB power from a computer.

FIG. 3 is a diagram illustrating one embodiment of a system 150. System 150 includes a laptop computer 152 and an electronic device 158. Computer 152 is electrically coupled to electronic device 158 through an Ethernet cable 154 and through a USB cable 156. In one embodiment, electronic device 158 includes an ADSL modem, an IP phone, an ATA, or other suitable electronic device. Electronic device 158 transmits and/or receives data from computer 152 through Ethernet cable 154. Electronic device 158 receives and maintains USB power from computer 152 through USB cable 156.

In this embodiment, the USB connection between computer 152 and electronic device 158 is compliant with the USB standard. Computer 152 recognizes both the Ethernet connection and the USB connection of electronic device 158. Upon connecting USB cable 156 between electronic device 158 and computer 152, computer 152 initiates the device enumeration and initialization procedure in compliance with the USB standard. In response to the device enumeration and initialization procedure, electronic device 158 informs computer 152 through USB cable 156 that electronic device 158 is an RNDIS device requiring high power (i.e., up to 500 mA).

After the completion of the initialization procedure, electronic device 158 enters into an RNDIS data initialized state. Data baffle between computer 152 and electronic device 158 passes through Ethernet cable 154. No data traffic between computer 152 and electronic device 158 passes through USB cable 156. With no data traffic passing through USB cable 156, computer 152 will suspend the USB device (i.e., electronic device 158 in this embodiment). In a suspended state, electronic device 158 is allowed to draw very little (e.g., 500 µA) current. To prevent computer 152 from suspending electronic device 158, electronic device 158 transmits remote NDIS keep alive signals to computer 152 through USB cable 156 as described below with reference to FIG. 4. In this way, electronic device 158 receives and maintains up to 500 mA of current from computer 152 while complying with the USB standard and without installing additional software on computer 152.

Figure 4:
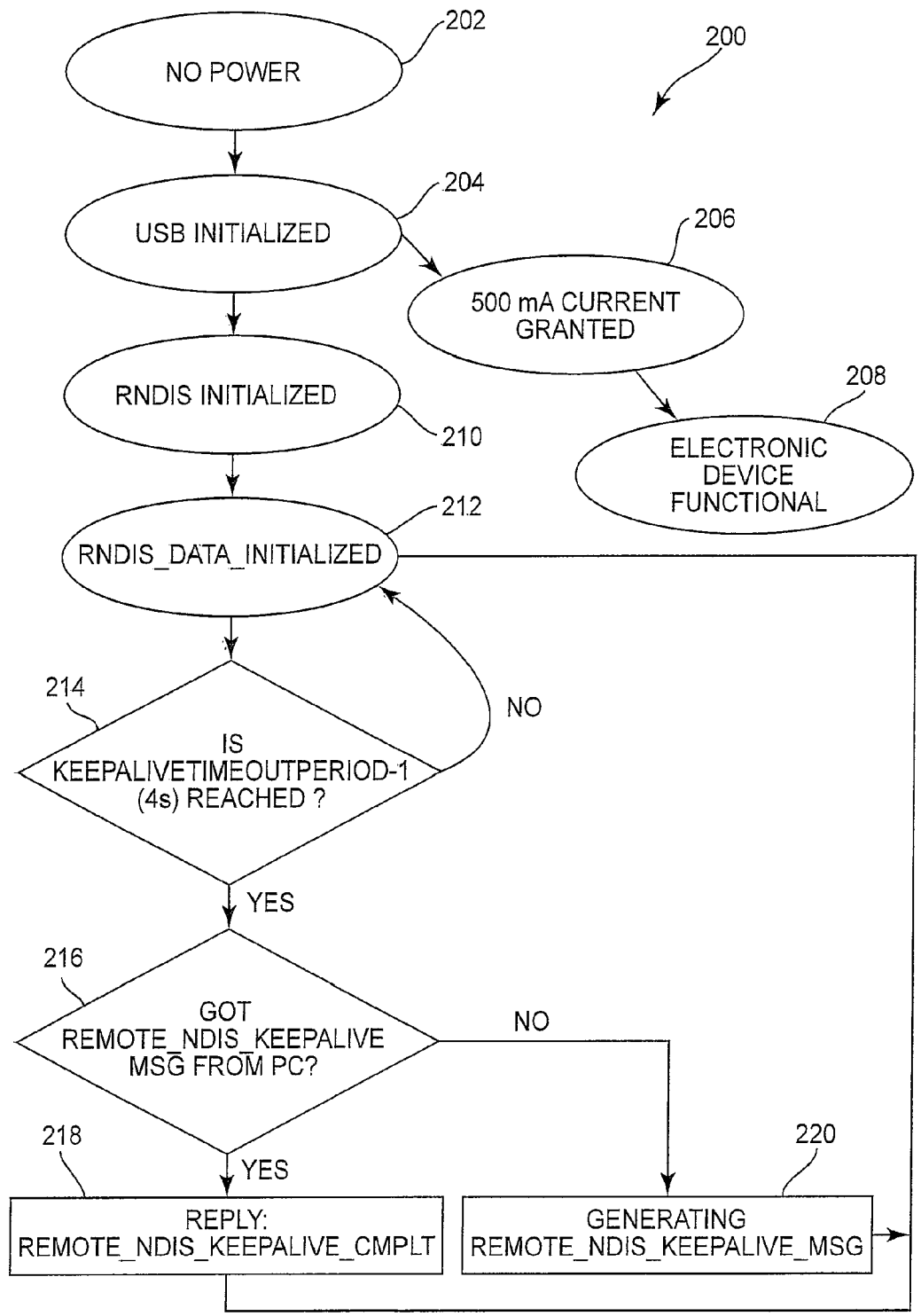
FIG. 4 is a flow diagram illustrating one embodiment of a method for an electronic device to tap USB power from a USB host port.

FIG. 4 is a flow diagram illustrating one embodiment of a method 200 for an electronic device to tap USB power from a USB host port. At 202, the electronic device, such as electronic device 120 previously described and illustrated with reference to FIG. 2 or electronic device 158 previously described and illustrated with reference to FIG. 3 is disconnected and therefore not powered. At 204, a USB cable is connected between the electronic device and the USB host port of a computer, such as computer 102 previously described and illustrated with reference to FIG. 1 or computer 152 previously described and illustrated with reference to FIG. 3. The USB host port of the computer then initializes the USB connection to the electronic device.

At 206 in response to the USB initialization, the electronic device is granted 500 mA of current to power the electronic device. At 208, the electronic device is powered and fully functional. At 210, the electronic, device is initialized as an RNDIS device, in response to the RNDIS initialization, at 212 the electronic device enters an RNDIS data initialized state. At 214, the electronic device determines whether an RNDIS keep alive timeout period (i.e., 5 seconds) minus one second (i.e., 4 seconds) has been reached. If the keep alive timeout period minus one second has not been reached, then the electronic device remains in the RNDIS data initialized state at 212.

If the keep alive timeout period minus one second has been reached, then at 216 the electronic device determines whether the electronic device has received a remote NDIS keep alive message from the computer. If the electronic device has not received a remote NDIS keep alive message from the computer, then at 220 the electronic device generates the remote NDIS keep alive message and passes it to the computer through the USB cable and the electronic device returns to the RNDIS data initialized state at 212. If the electronic device has received the remote NDIS keep alive message from the computer, then at 218 the electronic device replies to the computer with a remote NDIS keep alive completion signal and the electronic device returns to the RNDIS data, initialized state at 212. The keep alive process for the electronic device is repeated such that the electronic device maintains up to 500 mA of current through the USB cable from the USB host port of the computer.

Embodiments of the present invention provide an electronic device for tapping USB power from a USB host port of a computer while complying with the USB standard. In addition, the electronic device receives and maintains the USB power from the USB host port of the computer without installing software on the computer.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A device, comprising:
   a universal serial bus (USB) port comprising a data terminal and a power terminal to receive power from a host USB port; and
   a controller coupled to the data terminal of the host USB port to provide a power state signal that determines the power provided by the host USB port from a first state before or during initialization at a lower power and a second state after initialization at a higher power,
   wherein the power state signal is a remote network driver interface specification (RNDIS) signal,
   wherein the controller is configured to determine whether a predefined control signal has been received at the data terminal
   wherein the controller is configured to transmit a message signal to the data terminal when it is determined that the predefined control signal has not been received at the data terminal, and
   wherein the predefined control signal comprises a keep alive message; and
   wherein the device is not an RNDIS device, and the controller mimics the functions of an RNDIS device by sending a subset of RNDIS signals to the host port.

2. The device of claim 1, wherein the controller is configured to repeatedly transmit the message signal to a data port of the host USB port after the initialization.

3. The device of claim 1, wherein the message signals are generated in predetermined time intervals dependent on a predefined time out period.

4. The device of claim 1, wherein the controller is configured to regularly determine whether a predefined signal has been received at the data port.

5. The device of claim 1, wherein the device comprises one of a new digital subscriber line (DSL) modem, an Ethernet modem, an internet protocol (IP) phone, an Ethernet IP phone, an analog telephone adaptor (ATA), and an Ethernet ATA.

6. The device of claim 1, wherein the device further comprises a data communication port.

7. The device of claim 6, wherein the data communication port comprises an Ethernet port.

8. The device of claim 1, wherein the keep alive signal informs the device connected to the host USB port to maintain power from the host USB port.

9. The device of claim 1, further comprising a USB cable for connecting the device to the host USB port.

10. The device of claim 1, wherein the first state comprises a lower power up to 100 mA, and wherein the second state comprises a higher power up to 500 mA.

11. A method for a determining a power for a device connectable to a universal serial bus (USB) port, the device including a data terminal and a power terminal to receive power from a host USB port, the method comprising the steps of:
    providing a power state signal that determines the power provided by the host USB port from a first state before or during initialization at a lower power and a second state after initialization at a higher power,
    wherein the power state signal is a remote network driver interface specification (RNDIS) signal,
    determining whether a predefined control signal has been received at the data terminal,
    transmitting a message signal to the data terminal when it is determined that the predefined control signal has not been received at the data terminal, and
    wherein the predefined control signal comprises a keep alive message; and
    wherein the device is not an RNDIS device, and the controller mimics the functions of an RNDIS device by sending a subset of RNDIS signals to the host port.

12. The method of claim 11, further comprising the step of repeatedly transmitting the message signal to a data port of the host USB port after the initialization.

13. The method of claim 11, wherein the message signals are generated in predetermined time intervals dependent on a predefined time out period.

14. The method of claim 11, further comprising the step of regularly determining whether a predefined signal has been received at the data port.

15. The method of claim 11, wherein the device comprises one of a new digital subscriber line (DSL) modem, an Ethernet modem, an internet protocol (IP) phone, an Ethernet IP phone, an analog telephone adaptor (ATA), and an Ethernet ATA.

16. The method of claim 11, further comprising the step maintaining power from the host USB port when the keep alive signal is received.

17. The method of claim 11, wherein the first state comprises a lower power up to 100 mA, and wherein the second state comprises a higher power up to 500 mA.

* * * * *